Figure 1:
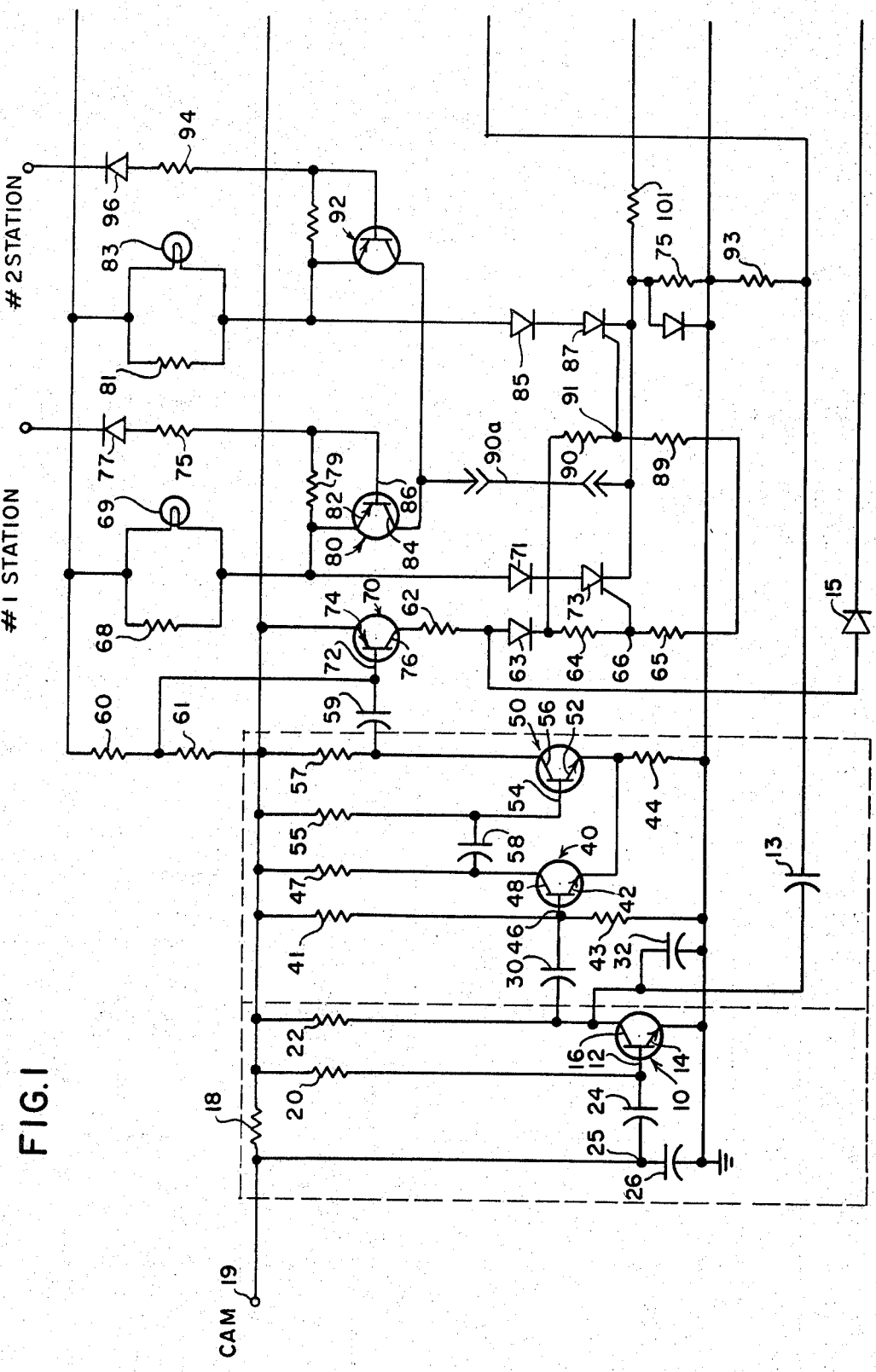

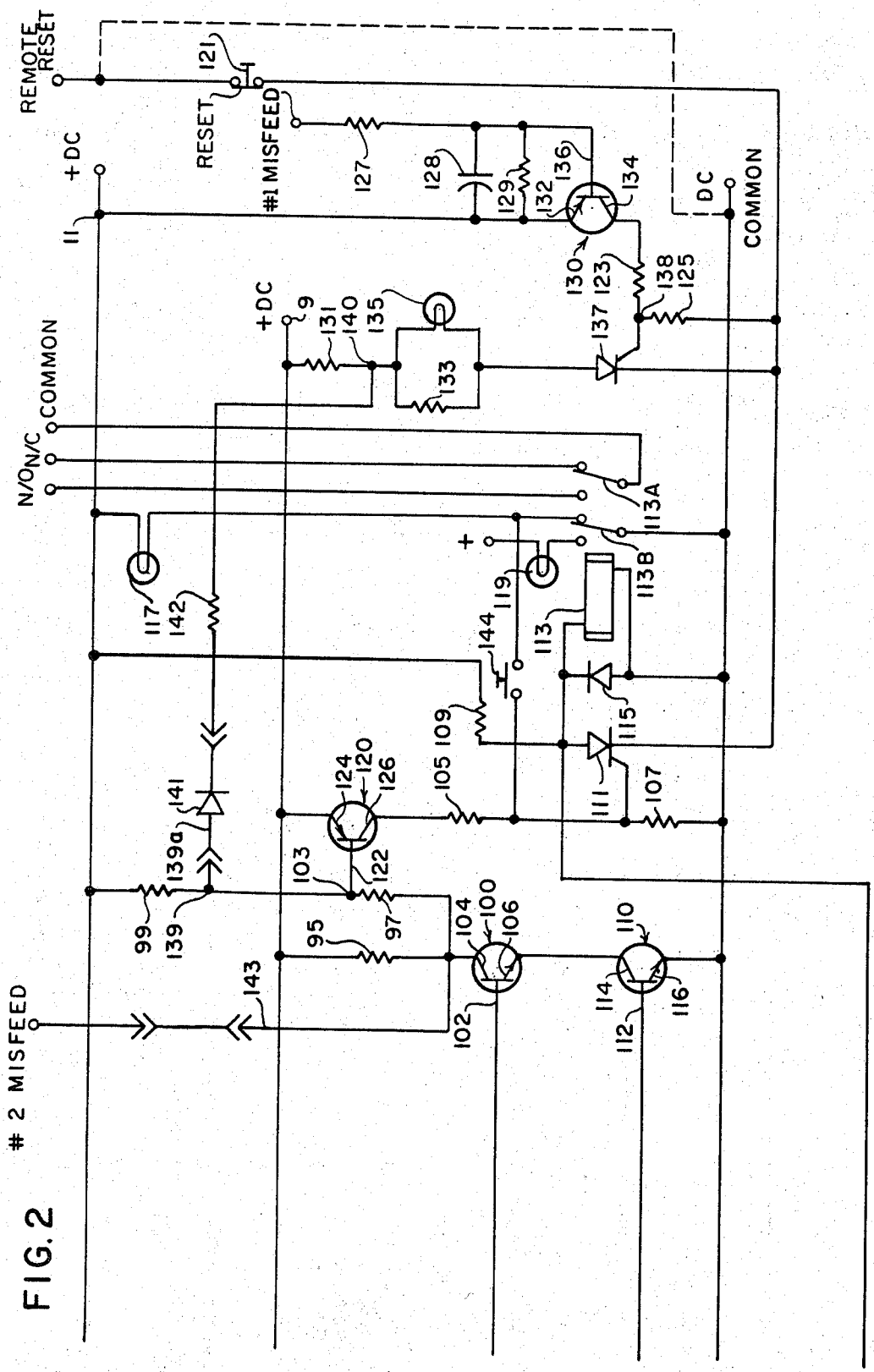

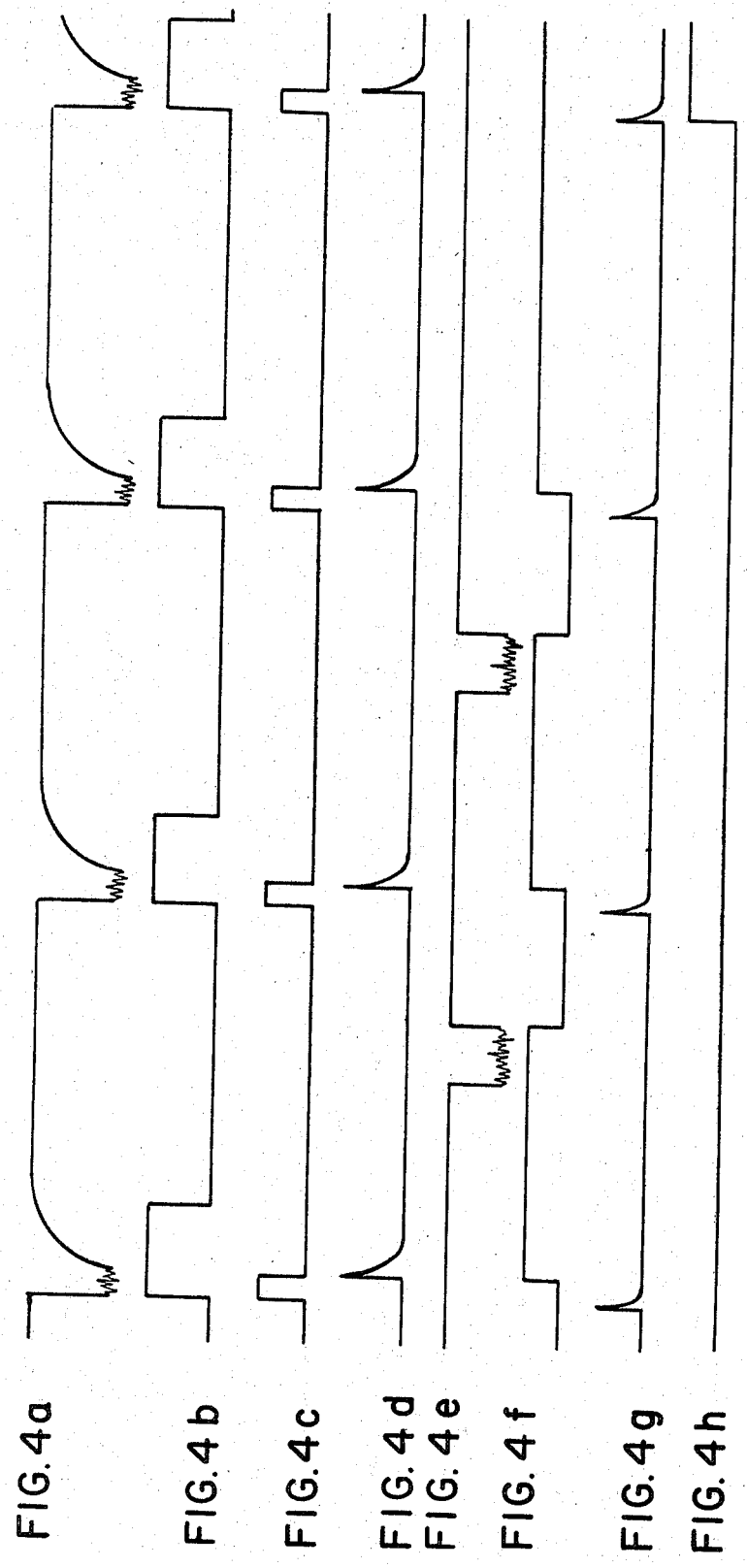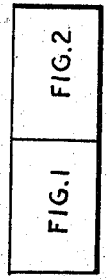

United States Patent Office 3,422,316
Patented Jan. 14, 1969

3,422,316
CONTROL APPARATUS FOR AUTOMATIC
EQUIPMENT
Peter Arkel, Rome, N.Y., and Solomon S. Schnell,
225—20 Mentone Ave., Jamaica, N.Y. 11413; said
Arkel assignor to said Schnell
Filed May 12, 1966, Ser. No. 549,533
U.S. Cl. 317—33                              10 Claims
Int. Cl. H02h 3/00; H02h 7/00

This invention relates to control apparatus. More particularly, it relates to an improved control apparatus for monitoring a machine for operational mishaps and for halting the running of such machine in response to the occurrence of a mishap.

In the operation of machines wherein operations are performed on workpieces fed thereto and wherein a plurality of operational stations are provided for performing said operations, many types of mishaps may occur. Typical mishaps may be an overload, i.e., when the thickness of a workpiece exceeds a predetermined amount, the failure of the feeding of a workpiece, a misfeed, etc. Such mishap unless immediately detected in an automatic production arrangement can result in grave injury to the machine with its concomitant repair costs, and the loss entailed by the disability of the machine. To insure that such deleterious effects do not occur, it is necessary to continuously automatically monitor all of the working stations and other operating areas of the machine and to halt the running of the machine.

Accordingly, it is an important object of this invention to provide a control apparatus for continuously automatically monitoring a machine having a plurality of operating stations and for halting the running machine in response to the occurrence of an operational mishap.

It is another object to provide control apparatus in accordance with the preceding object which is essentially of an electronic nature and employs a minimum of electromechanical relays.

Generally speaking, and in accordance with the invention, there is provided apparatus for halting the running of a machine in response to an operational mishap wherein the machine comprises a plurality of stations where operations are performed on workpieces and a circuit device which is capable of being in an actuated and deactivated state, a given one of the states causing the machine to run, the other of preventing the machine from running, a proper operation on a workpiece at a station causing the producing of an electric potential. The apparatus comprises continuousely rotatable means for producing a first electric signal during each cycle of rotation. First means are provided responsive to the application thereto of the first signal for producing an output for a chosen duration and delay means are included, responsive to the application thereto of the first means for producing a pulse output of a predetermined width. There are provided second means responsive to the application thereto of the output of the delay means for a producing output having a leading edge delayed with respect to the leading edge of the delay means pulse output. In the aforesaid plurality of stations gate controlled rectifiers are included, each of the rectifiers being respectively associated with one of the stations and means are provided for applying the second means pulse output as a gating pulse to the station gate controlled rectifiers to render them conductive. There are further provided the aforesaid plurality of means respectively responsive to the production of the electrical potentials in response to proper operations at the stations for sequentially generating signals for correspondingly cutting off the gate controlled rectifiers at each of the stations. Also included are AND gate means, means for differentiating the output of the first means and applying such differentiated output as a first input to the AND gate means, and means for applying the output of the station gate controlled rectifiers as a second input to the AND gate means, the AND gate means being enabled in response to the failure of providing of an electric potential at station in response to a mishap thereat. The output of the AND gate means is applied as a gating input to a mishap sensing gate controlled rectifier, the last named gate controlled rectifier being rendered conductive when the AND gate means is enabled. A relay is provided in circuit with the mishap gate controlled rectifier whose state is switched upon the rendering conductive of the last named gate controlled rectifier whereby contacts associated with the relay and in circuit with the machine controlling circuit device are switched in their position to change the circuit device from the aforesaid given one state to the other of its states to halt the machine.

For a better understanding of the invention together with the other and further objects thereof, reference is had to the following description taken in connection with the accompanying drawing and its scope is pointed out in the appended claims.

In the drawings:

FIGS. 1 and 2 taken together as in FIG. 3 is a schematic diagram of an illustrative embodiment constructed in accordance with the principles of the invention; and FIGS. 4a to 4h comprise a timing diagram of pertinent waveforms occurring in various points of the circuits of FIGS. 1 to 3.

Referring now to FIGS. 1 to 3 and FIGS. 4a to 4h, there is shown therein a transistor 10 connected in the common emitter configuration, transistor 10 comprising an emitter 14 connected directly to common base 12 connected to a unidirectional positive potential source through a resistor 20, and to a cam 19 through resistor 20, and a resistor 18. The collector of transistor 10 is connected to a positive potential source 9 through a resistor 22. Base 12 is connected to cam 19 through a capacitor 24, the junction 25 of capacitor 24 and cam 19 being coupled to ground through a capacitor 26.

Cam 19 is suitably configurated whereby it makes contact with ground potential during each rotational cycle thereof to produce the waveform shown in FIG. 4a. The operating potentials for transistor 10 are chosen whereby it is normally conductive. When cam 19 makes contact with ground during its rotational cycle, capacitor 26 is enabled to be rapidly discharged to ground and base 12 driven suddenly negative to render transistor 10 nonconductive. The time constant circuit constructed by capacitor 24 and resistor 20 maintains base 12 negative for the period of the aforesaid time constant. Consequently, during this period, the output at collector 16 has the waveform shown in FIG. 4b, collector 16 being AC by-passed to ground by a capacitor 32.

The output appearing at collector 16 is applied to a multivibrator comprising transistors 40 and 50 through a coupling capacitor 30. In the multivibrator, the emitter 42 of transistor 40 is connected to ground through a resistor 44. The base 46 thereof is connected to unidirectional potential source 9 through a resistor 41, and is connected to ground through a resistor 43, and the collector 48 is connected to unidirectional potential source 9 through a resistor 47. The emitter 52 of transistor 50 is connected to ground through resistor 44, the base 54 is connected to unidirectional potential source 9 through a resistor 55 and the collector 56 is connected to unidirectional potential source 9 through a resistor 57. Collector 48 is coupled to base 54 through a capacitor 58.

The multivibrator comprising transistors 40 and 50, and the associated circuit elements is monostable multivibrator in which transistor 40 is normally at cutoff and transistor 50 is normally conductive. Thus, when a positive output appears at collector 16 of transistor 10 in response to the completion of the circuit through cam 19, transistor 50 is rendered nonconductive thereby and transistor 40 is rendered conductive to produce the waveform shown in FIG. 4c at collector 56, the width of this waveform, i.e., the astable period of the multivibrator being determined by the values of the time constant circuit comprising capacitor 58 and resistor 55.

The output appearing at collector 56 is applied as an input to a set pulse amplifier comprising a transistor 70 through a coupling capacitor 59. In this amplifier, the base 72 of transistor 70 is connected to a source of unidirectional positive potential 11 through a resistor 60, source 11 having a higher value than source 9, the respective values of sources 9 and 11 suitably being plus 8.5 and plus 17.0 volts respectively. A resistor 61 is provided between source 9 and resistor 60. The emitter 74 of transistor 70 is directly connected to source 9 and the collector 76 is connected to ground through the series arrangement of a resistor 62, the anode to cathode path of a diode and a resistor 64 and a resistor 65.

Connected between source 11 and ground is the series arrangement of the parallel combination of a resistor 68 and a lamp 69, the anode to cathode path of a diode, the anode to cathode path of a silicon controlled rectifier 73 and the parallel combination of a resistor 75 and the anode to cathode path of a diode 77, the gate electrode of silicon controlled rectifier 73 being connected to the junction 66 of resistors 64 and 65.

During the astable period of the multivibrator i.e., when transistor 50 is nonconductive to produce the pulse output at collector 56 as shown in the waveform of FIG. 4c, transistor 70 which is normally nonconductive is rendered conductive thereby. Now when the multivibrator reverts to its normal, i.e., stable state, transistor 70 is again rendered conductive whereby the positive pulse which is shown in the waveform of FIG. 4d appears at junction 66.

The pulse appearing at junction 66 renders conductive silicon controlled rectifier 73 whereby current flows through lamp 60 to illuminate it and silicon controlled rectifier 73 remains conductive after the delay of the pulse at junction 66.

A transistor 80 comprises an emitter 82 connected to the anode of diode 71, a collector 84 connected to ground and a base 86 connected to a point legended as No. 1 station through a resistor 75 and the anode to cathode path of a diode 77. A resistor 79 is connected between emitter 82 and resistor 75. The No. 1 station point designates a point of the machine being controlled by the circuit of FIGS. 1 to 3 where a machine operation is being performed such as a punch or the like, and where an article or workpiece is monitored for proper thickness for example. In the event that such thickness is proper, for example, then a ground connection occurs at the No. 1 station to render transistor 80 conductive whereby the positive pulse appearing at the collector 84 renders silicon controlled rectifier 73 nonconductive to extinguish lamp 69 when transistor 80 is also nonconductive. FIG. 4d shows the pulses appearing at a station whereby silicon controlled rectifier 73 remains conductive and lamp 60 remains illuminated.

The series arrangement connected between source 11 and ground of the parallel combination of a resistor 81 and a lamp 53, the anode to cathode path of a diode, the anode to cathode path of a silicon controlled rectifier 87 and a resistor 89 corresponds to the similar series arrangement of the No. 1 station for a No. 2 station, a resistor 90 being provided between diode 63 and resistor 89, the junction 91 of resistor 90 and 89 being connected to the gate electrode of silicon controlled rectifier 87. Thus the output of the set pulse amplifier comprising transistor 70 also gates silicon controlled rectifier 87 into conductivity to illuminate lamp 83. A transistor 92 connected to the No. 2 station point through a resistor 94 and the anode to cathode path of a diode 96 functions in a manner corresponding to that of transistor 80 to render silicon controlled rectifier 87 nonconductive in the absence of a fault at the No. 2 station and thereby to extinguish the station lamp 83.

Thus in considering the operation of the system of FIGS. 1 to 3, as described thus far, in a rotation cycle of cam 19, all of the station lamps are simultaneously illuminated and as each station is passed without the occurrence of a fault, the lamps are simultaneously extinguished. Any number of stations, such as up to twelve, may be monitored in this matter within a rotational cycle of cam 19. The delay imparted by the multivibrator comprising transistors 40 and 50 serves to insure that the gate stage which is enabled on the occurrence of a fault cannot be enabled during nonfault operation as is further explained hereinbelow. The gating pulse for the station silicon controlled rectifiers such as rectifiers 73 and 87 and shaped by the selection of the value of capacitor 59 which is part of a differentiating circuit for differentiating the input to transistor 70.

It is seen that the output of transistor 10 is also applied as input to the base 102 of a transistor 100 through a capacitor 13, such input being developed across a resistor 93. The collector 104 of transistor 100 is connected to source 9 through a resistor 95 and a resistor 99. The cathodes of silicon controlled rectifiers 73 and 87 are connected to the base 112 of a transistor 110 through a resistor 101. The emitter 106 of transistor 100 is connected to the collector 114 of transistor 110, the emitter of transistor 110 being connected to ground. Transistors 100 and 110 and their associated circuit elements constitute an "AND" gate which is enabled to produce a negative potential output only when positive inputs appear at bases 102 and 112 simultaneously. The value of capacitor 13 is chosen such that it forms a differentiating circuit with resistor 93 to produce the waveform shown in FIG. 4g which is the waveform of the input to base 102. The waveform of the input to base 112 is as shown in FIG. 4b.

It is seen that with no faults occurring at any of the stations as shown in the first two cycles in waveforms 4d, 4f and 4g, no coincidence of positive inputs occurs at the base of transistors 100 and 110 and the gate comprised thereof is not enabled. Transistor 120 has its base 122 connected to the junction 103 of resistors 97 and 99, its emitter 124 connected directly to source 9 and its collector 126 connected to ground through the series arrangement of resistors 105 and 107. The series arrangement of a resistor 109 and the anode to cathode path of a silicon controlled rectifier 111 is connected between source 11 and ground through a closed reset switch 121. The junction of resistor 62 and diode 63 is connected to the anode of silicon controlled rectifier 111 through the anode to cathode path of diode 15.

Let it be assumed that during a rotation of a cycle of cam 19, a fault occurs at a station whereby its transistor is not rendered conductive, such fault being shown in waveform 4e. Consequently, the corresponding station silicon controlled rectifier is not turned off by the transistor whereby the gate comprising transistors 100 and 110 is enabled as shown in FIG. 4h. Such enabling in turn renders transistor 120 conductive to gate into conductivity silicon controlled rectifier 111. With this event, during the next cycle of rotation of cam 19, the pulse output of transistor 70 is bypassed through diode 15 and conductive silicon controlled rectifier 111 and the nonconductive station silicon controlled rectifiers are not rendered conductive there remaining illuminated only the lamp at the station where the fault occurred.

The parallel combination of a relay coil 113 and surge suppression diode 115 is connected between resistor 109 and ground. When silicon controlled rectifier 111 is rendered conductive, coil 113 is actuated to switch the position of its associated contacts.

The circuit of FIGS. 1 to 3 is adapted to control a solenoid in the machine being controlled. If in the normal operation of such machine such solenoid is in deenergized state, through its connection to common through the switch position of contacts 113A, by the actuation of coil 113 it is energized to stop the machine. If, in the operation of such machine, such controlled solenoid is normally energized through its connection to common, the switching of the contacts 113A disconnects the solenoid from common to halt the operation of the machine. The actuation of relay coil 113 also removes from circuit, i.e., extinguishes a normally illuminated lamp 117 and causes the illumination of a normally extinguished fault lamp 119, such events being effected by the switching of the positions of contacts 113B.

A transistor 130 has its emitter 132 directly connected to source 11, its collector 134 connected to ground through the series arrangement of resistors 123 and 125 and its base 136 connected to a point legended misfeed through a resistor 127. Emitter 132 and base 136 are interconnected by the parallel combination of capacitor 128 and a resistor 129 connected between source 9 and ground is the series arrangement of a resistor 131, the parallel combination of a resistor 133 and a lamp 135, the anode to cathode path of silicon controlled rectifier 137 and the closed position of remote reset switch 121. The junction 138 of resistors 123 and 125 is connected to the gate electrode of silicon controlled rectifier 137. The junction 139 of resistors 97 and 99 is connected to the junction 140 of resistors 131 and 133 through the anode to cathode path of a diode 141 and a resistor 142.

In the event that there is a misfeed in the machine being controlled and a misfeed at a station might function the same as a normal operation to connect the station transistor to ground whereby such misfeed would not be detected, the rendering conductive of transistor 130 by the detection of a misfeed causes the gating of silicon controlled rectifier 137 into conductivity to cause the illumination of lamp 135 to indicate the misfeed.

In this connection the conductor 143 connected to base 122 of transistor 120 through resistor 97 is also arranged to contact ground if a misfeed occurs to render transistor 120 conductive in the absence of a fault output from the gate comprising transistors 100 and 110 to render silicon controlled rectifier 111 conductive to stop the machine. The arrangement of transistor 130 and silicon controlled rectifier 137 functions as a fail-safe feature with regard to a misfeed.

In the event that it is desired to stop the controlled machine in the absence of a fault, a normally open switch 144, is closed to connect the gate electrode of silicon controlled rectifier 111 to source 11 through lamp 117. The opening of normally closed remote reset switch 121 prevents the turning off of silicon controlled rectifiers 111 and 137 if they are conducting.

From the foregoing it may be appreciated that the circuit of FIGS. 1 to 3 may be utilized with its fault detection arrangement to readily detect faults in machine operation where a ground connection in such operation indicates proper machine functioning. Such faults may be for example, an overload, i.e., improper excess thickness of a workpiece which prevents a ground connection, and the missing of a workpiece to prevent such ground connection. In addition, it may detect a fault which is evident by the effecting of a ground connection which should normally not occur, such as a misfeed, for example.

With the inclusion of conductor 90a, connected as shown, it is ensured that the input for transistor 110 cannot drop to ground potential unless silicon controlled rectifiers 73 and 87 had been turned off by the rendering conductive of transistors 80 and 92 by the proper occurrence of grounds at stations No. 1 and No. 2.

Conductor 139a having diode 141 and resistor 142 in series arrangement therein insures the presence of sufficient negative potential at junction 140 to render transistor 120 conductive in the event that a misfeed occurs at the No. 1 misfeed point. If, instead, the misfeed occurs at the No. 2 misfeed point, then no light indication occurs at the occurrence of a misfeed other than that of lamp 119.

The circuit of FIGS. 1 to 3 lends itself readily to its adapting for counting workpieces which are sequentially processed by the machine. Such counting can readily be effected by sequentially applying the respective pulsed outputs of the station transistors as individual count inputs to a suitable counter.

While there has been described what is considered to be a preferred embodiment of this invention, it will be obvious to those skilled in the art that various changes and modifications may be made therein without departing from the invention and it is therefore aimed to cover all such changes and modifications as fall within the true spirit and scope of the invention.

What is claimed as new and desired to be secured by Letters Patent of the United States is:

1. Apparatus for halting the running of a machine in response to an operational mishap wherein said machine comprises a plurality of stations where operations are performed on workpieces, and a circuit device which is capable of being in an activated and deactivated state, a given one of said states causing said machine to run, the other of said states preventing said machine from running, a proper operation on a workpiece at a station causing the producing of an electric potential, comprising continuously rotatable means for producing a first electric signal during such cycle of rotation thereof, the time of said cycle being so chosen whereby all of said stations are traversed during said cycle, first means responsive to the application thereto of said first signal for producing an output for a chosen duration, delay means responsive to the application thereto of the output of said first means for producing a pulse output of a predetermined width, second means responsive to the application thereto of the output of said delay means for producing a pulse output having a leading edge delayed with respect to the leading edge of said delay means pulse output, a plurality of station gate controlled rectifiers each respectively associated with one of said stations, means applying said pulse output of said second means as a gating pulse to said gate controlled rectifiers to render said rectifiers conductive, a plurality of means respectively responsive to said proper operation at said stations for generating signals for cutting off the gate controlled rectifiers at each of said stations, means for differentiating the output of said first means and applying the differentiating output as a first input to an AND gate means, means for applying the output of said station gate controlled rectifiers as a second input to said AND gate means, said AND gate means being enabled in response to the failure of production of said electric potential at a station in response to a mishap thereat, a mishap sensing means for applying the output of said AND gate means as a gating input to a mishap gate controlled rectifier, said last named gate controlled rectifier being rendered conductive when said AND gate means is enabled, contacts associated with said relay and in the circuit with said machine controlling circuit device, the switching of the state of said relay causing a corresponding switching of the position of said contacts to change said circuit device from said given one state to the other of its states to halt said machine.

2. Apparatus as defined in claim 1, wherein there is further included means for applying the output of said second means to said mishap gate controlled rectifier to prevent the gating into conductivity of station gate controlled rectifiers when said mishap gate controlled rectifier is conductive.

3. Apparatus as defined in claim 2 and further including means in circuit with said mishap gate controlled rectifier responsive to the occurrence of a misfeed in said machine, said misfeed causing the production of said electric potential for gating said mishap gate controlled rectifier into conductivity to cause the halting of said machine.

4. Apparatus as defined in claim 3, wherein a lamp is respectively included in circuit with each of said station gate controlled rectifiers respectively, said lamps being illuminated during the conductivity periods of said last named rectifier.

5. Apparatus as defined in claim 4, and further including the series arrangement of a lamp and misfeed gate controlled rectifier and means responsive to the production of said electric potential in said machine caused by a misfeed for gating said misfeed gate controlled rectifier into conductivity to illuminate said lamp.

6. Apparatus as defined in claim 5 wherein said rotatable means comprise a rotatable cam and further including an active device in circuit with said cam for generating said first signal, said active device including a time constant circuit in its input for producing said first signal with a predetermined width.

7. Apparatus as defined in claim 5 wherein said delay means comprises an emitter coupled monostable multivibrator.

8. Apparatus as defined in claim 7 wherein said second means includes means for differentiating the output of said multivibrator and an active device through which said last named differentiated output is applied as a gating input to said station gate controlled rectifiers.

9. Apparatus as defined in claim 5, wherein said AND gate means comprises a coincidence circuit comprising a pair of active devices, said coincidence circuit being enabled upon the simultaneous occurrence of respective inputs of the same polarity to each of said last named active devices.

10. Apparatus as defined in claim 5, and further including a normally closed switch connected between the output of said mishap and said misfeed gate controlled rectifier and ground, the opening of said switch returning said last named gate controlled rectifier from the conductive to the non-conductive state.

References Cited

UNITED STATES PATENTS

| 3,146,358 | 8/1964 | Pratt | 317—33 X |
| 3,167,685 | 1/1965 | Bade et al. | 317—33 X |
| 3,213,321 | 10/1965 | Dalziel | 317—33 X |
| 3,315,130 | 4/1967 | Carter | 317—33 |
| 3,335,325 | 8/1967 | Elpers | 317—33 X |

LEE T. HIX, *Primary Examiner.*

R. V. LUPO, *Assistant Examiner.*

U.S. Cl. X.R.

317—31, 26